Oct. 3, 1950          L. T. AKELEY          2,524,506
SWITCH FOR ELECTRIC HOT PLATES
Filed June 3, 1948
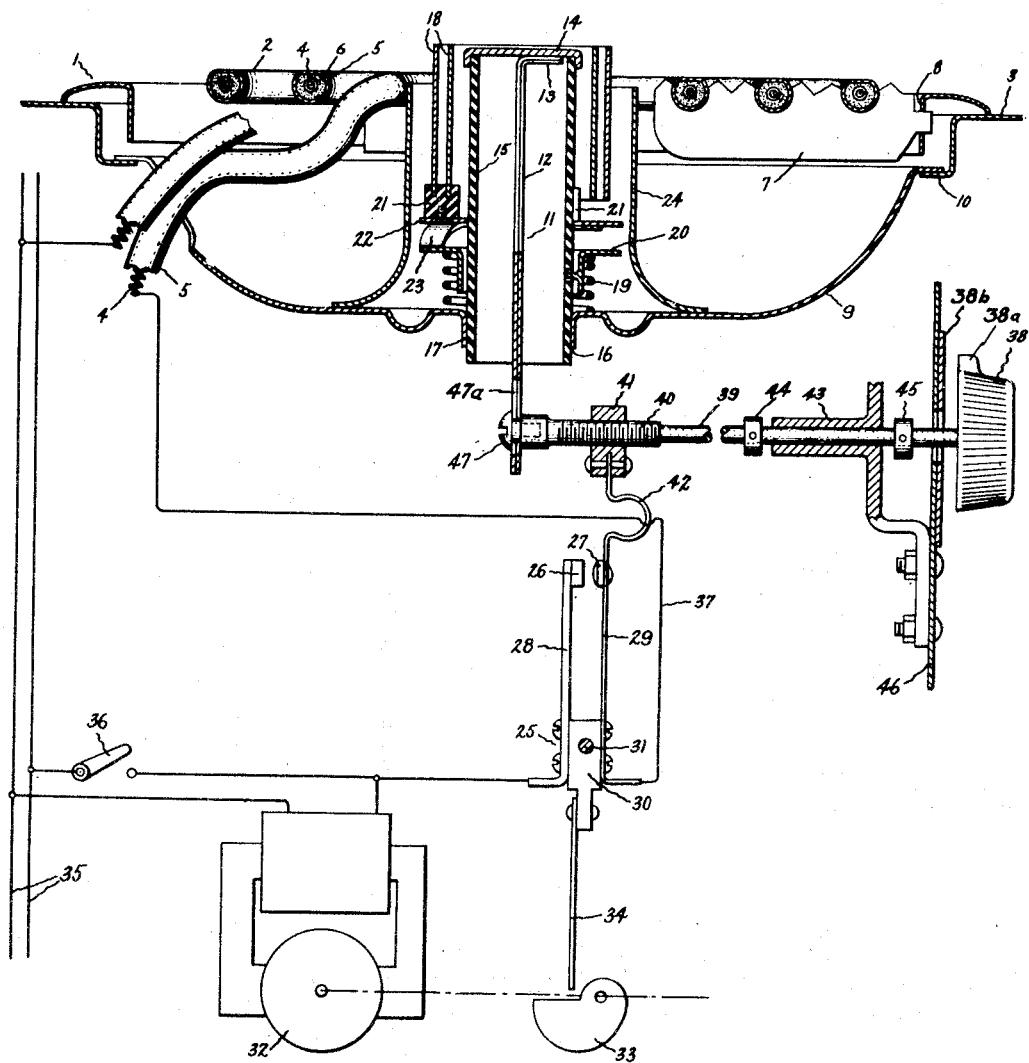
Inventor:
Lloyd T. Akeley,
by Alfred E. Bobst
His Attorney.

Patented Oct. 3, 1950

2,524,506

UNITED STATES PATENT OFFICE 2,524,506

SWITCH FOR ELECTRIC HOT PLATES

Lloyd T. Akeley, Lynn, Mass., assignor to General Electric Company, a corporation of New York Application June 3, 1948, Serial No. 30,836

1 Claim. (Cl. 200—136.3)

This invention relates to electric hotplates for electric ranges and the like, and it has for its object the provision of an inexpensive and simple apparatus of this character which for certain cooking operations automatically will reduce the heat from a high initial value, which rapidly bring the food to the cooking temperature, to a lower cooking value which maintains the cooking temperature.

More specifically, this invention contemplates an improved hotplate having a heating element, and temperature control means for the heating element, which means functions responsively to the temperature of the cooking vessel on the hotplate to operate the heating element first to deliver a maximum heat quickly to bring the cooking vessel to the cooking temperature and then automatically to reduce the heat delivery so as to maintain the cooking temperature. A time element device, such as a constant speed motor, controls the energization and deenergization of the heating element; and an adjustable temperature responsive element on the hotplate, positioned so as to be in thermal response to a cooking vessel placed upon the hotplate, is connected to the time element device in order to adjust the proportion of time the heating element is energized to the time it is deenergized in accordance with the temperature of the cooking vessel, all constructed and arranged so that the heating element initially will apply a high quantity of heat in accordance with the temperature setting to bring the cooking vessel quickly to the cooking temperature, and thereafter, the heat is reduced in accordance with the cooking vessel temperature in order to apply only sufficient heat to maintain the cooking temperature.

For a more complete understanding of this invention, reference should be had to the accompanying drawings in which the single figure illustrates an electric hotplate arranged in accordance with this invention, together with certain of the control elements for the plate illustrated diagrammatically.

Referring to the drawing, this invention has been shown in one form as applied to an electric hotplate 1 comprising a heat generating element 2. The element 2 is in the form of a spiral, the upper surfaces of the turns of which are in a horizontal cooking plane, and preferably these surfaces will be flattened somewhat, as shown. It will be understood that the cooking vessel will be supported directly by these flattened surfaces in the cooking plane. Also, it will be observed that the cooking plane is elevated somewhat with respect to the cooking top surface 3 of the range. The heating element preferably will be of the sheathed type comprising a helical resistance conductor 4 housed within a tubular metallic sheath 5 and embedded in and held in spaced relation with reference to this sheath by a compact mass of electrically insulating and heat conducting material 6, such as powered magnesium oxide. The element 2 is supported in a grid-like spider 7 which, in turn, is mounted in a ring 8 which supports the grid and heating element from the top surface 3 as shown. Under the element 2 is a bowl-shaped metallic reflector pan 9 which is supported by means of a flange 10 attached to the top surface 3.

The heating element 2 is controlled by a system comprising a temperature responsive control device 11 mounted in the central area of the hotplate. This device comprises a temperature responsive element 12 in the form of a bimetallic bar; this bar is formed of two metals having dissimilar coefficients of expansion and secured together lengthwise from end to end. The upper end 13 of the bar is formed at right angles to the main body of the bar and this portion is secured to a disk-like cap 14, formed of a good heat conducting material such as copper or aluminum; the section 13 is secured to the cap 14 in any suitable fashion, as by brazing. The thermostatic bar 11 is so arranged that when it is cool, that is, at room temperature, it occupies its position shown, whereas when it is heated, it tends to move toward the right, that is, counterclockwise, as viewed in the figure.

The cap 14 is supported on and closes the upper end of a heat insulating cylindrical tube 15 mounted vertically with its central axis substantially coincident with the central vertical axis of the heating unit, and which tube is formed of any suitable heat insulating material such as a phenol condensation product. The tube extends downwardly through a central aperture 16 formed in the bottom wall of the reflector 9 as shown. Preferably, and as shown, the reflector is provided with a downwardly extending wall 17 which closely fits the outer surface of the tube 15 and which functions both to hold the tube in its proper position with relation to the reflector 9 and to act as a guide for the tube.

The heating unit 2 also has a series 18 of heat insulating cylinders formed of heat reflecting metallic material and positioned around the upper end of tube 15 in concentric relation with it and with each other and about the zone of the tube housing the upper end of the bimetallic bar 11, as shown. These cylinders as well as the cylinder 15 function to prevent radiant heat of the heating element 2 from gaining access to the bimetallic bar.

The tube 15 is supported by and is biased upwardly, so that normally (when the hotplate is not loaded by a cooking vessel) the cap 14 lies above the cooking plate of the heating element, by a helical compression spring 19 having its upper end bearing against a metallic flange 20 attached to the tube 15 and its lower end bearing against the bottom of the reflector 9. The tubes 18 at their lower ends are secured together by means of blocks of heat insulating material 21, and these blocks are attached to a plate 22; the plate 22 is biased upwardly by springs 23 which are lanced from the material of which the flange 20 is made and which project upwardly to bias the tube assembly 18 upwardly. The springs 23 are arranged to bias these tubes so that their upper ends lie in a plane above the top surface of the cap 14 when the heating unit is unloaded. It will be observed that the assembly of the tubes 18 and their supports 21 and 22 merely rest upon the springs 22 so that this assembly may be removed as a unit and cleaned if it is desired to do so.

Surrounding the assembly of the tubes 15 and 18 and their supporting means, and in spaced relation with respect to these elements is a metallic tube 24; the upper end of this tube is below the level of the cooking plane, and its lower end is flared outwardly and secured to the reflector bowl 9.

It will be understood that when a cooking vessel is placed on the heating unit it first will engage the tube series 18 and depress it against the force of the springs 23 and then will engage the cap 14 and depress the tube 15 along with the tubes 18 against the force of the spring 19, whereby the cap 14 is firmly pressed against the bottom of the cooking vessel and so also will the tubes 18. The cooking vessel, therefore, constitutes a thermal "ground" of high heat capacity for the tube 15 and the metallic tubes 18 and, hence, functions to drain heat from them, which heat is radiated to them from the high temperature heating element 2.

The heat insulating and shielding arrangement with the heat conducting cap just described is shown and claimed in my application Serial No. 30,835 filed concurrently herewith and assigned to the same assignee as the present application.

The control for the heating element 2 further includes a time element switch 25, the action of which is modified by means of the bimetallic element 11. The device 25 comprises a pair of coacting contacts 26 and 27; the contact 26 is mounted upon one end of a rigid switch arm 28, while contact 27 is mounted on one end of a flexible switch arm 29.

The two switch arms 28 and 29 are arranged in substantially parallel relation, and at their other ends they are secured to a support 30. The support 30 is mounted to oscillate upon a fixed shaft 31. The support 30 is periodically oscillated by means of a constant speed timing motor 32 which is connected to drive a cam 33. The cam 33 coacts with a flexible blade 34 extending from the support 30, as shown. While the cam 33 may be driven at any suitable speed, in the embodiment given, it is driven at one revolution per minute. Since the motor 32 may be a relatively high speed device, it will be understood that it may be connected with the cam 33 through a suitable gear reduction drive (not shown).

The switch contact arms 26 and 27 function to control the energization and deenergization of the heating element 2 in such fashion that when they are closed they connect the heating element to the two wires of the electric supply source 35, and when they are open they disconnect this heating element from this source. As shown, the right-hand conductor of this source 35 is connected to the switch arm 28 through a manually operable switch 36, the circuit for the heating element being traced from this switch 36 through the switch contacts 26 and 27, flexible switch arm 29, conductor 37 and thence through the resistance conductor 4 of the heating element to the other conductor of the supply source 35. In other words, the heating element is connected to the supply source in series with the switch contacts 26 and 27. The timing motor is connected across the two conductors of the supply source when the switch 36 is closed, as shown, and hence is energized to operate.

The flexible switch arm 29 is mechanically connected to a manually operable temperature setting knob 38 by means of a rod 39 which is rotatable by the knob and which, as shown, has a threaded section 40. Knob 38 has an index 38a which operates against a temperature scale 38b to assist in setting the knob to the desired final cooking temperature. Threaded on the threaded section 40 of rod 39 is a nut 41 which is attached to the contact end of the arm 29 through a flexible U-shaped section 42. The shaft 39 is journalled in a bearing 43 for rotation therein and also for longitudinal sliding motion with respect to it. The sliding movement of the shaft with respect to the bearing is limited by collars 44 and 45 secured to the shaft. The bearing 43 is mounted upon a panel 46 which may be the forward front wall of the range, the knob 38 being accessible at the front of this wall.

The switch contact 27 also is connected to the bimetallic bar 11 through the medium of the shaft 39, which shaft has its inner end connected to the lower end of the bimetal element by screw fastening device 47, this device permitting the shaft to rotate in the lower end of the bimetal element. Screw fastening device 47 is passed through a vertical slot 47a in bimetal bar 11 and is headed so that the shaft takes a longitudinal position depending upon the position and hence the temperature of the bimetallic element.

In the operation of the hotplate, in order to start the cooking operation, the manual switch 36 is closed. This operation energizes the timing motor 32, which thereupon operates the cam 33 counterclockwise as viewed in the figure. As the cam rotates, once each revolution it engages the arm 34 to move the support 30 clockwise. This operation moves the contact 26 into engagement with the contact 27. The contact arm 29, upon which 27 is mounted, flexes slightly toward the right, but since its upper end is connected to the nut 41 the contact 27 will not move far in this direction, but will be engaged by the contact 26, which is free to move with support 30. This action takes place once each revolution of the cam 33, and as long as the two contacts 26 and 27 are held in engagement by the cam, it is clear that the heating element 2 will be energized. The proportion of the time that the two contacts are in engagement to the time that they are not in engagement for each revolution of cam 33 is determined initially by the setting of knob 38. If the knob 38 is turned to the highest heat position, the nut 41 will have been moved so far to the left that the contacts 27 and 28 will be in engagement throughout the entire revolution of cam 33. The knob 38, however, may be adjusted to move the nut 41 to various positions toward the right from this extreme position so as to pick out more or less of the time cycle that the heater is energized, thus controlling the wattage input to the heater. Knob 38 may thus be adjusted to provide a graduated control from High to Low or Off heat.

The position of contact 27, however, is further controlled, and hence the energy input to the heating element 2 is further controlled, by the action of the bimetallic element 12; as the cooking vessel heats up, the bimetal 12 heats by way of the cap 14 which tends to become the temperature of the cooking vessel. As a result, bar 11 moves toward the right and hence, shifts the position of contact 27 away from contact 26. The effect of this, it is clear, is to decrease the proportion of time that the heater is energized to the time it is not energized for each revolution of the cam 33, and hence the wattage is automatically reduced as the temperature of the cooking vessel rises. This automatically reduces the wattage input as the cooking vessel approaches the coking temperature; the final equilibrium wattage input will produce a final cooking temperature.

In other words, the energization of the heating element 2 is controlled jointly responsively to the temperature of the cooking vessel and to the manual setting of the control knob 38.

While I have shown and described a particular embodiment of my invention, it will occur to those skilled in the art that various changes and modifications may be made without departing from my invention, and I therefore aim in the appended claim to cover all such changes and modifications as fall within the true spirit and scope of my invention.

What I claim as new and desire to secure by Letters Patent of the United States is:

In an electric heating device having a heating element, a power circuit thereto, a thermal device movable in response to the temperature of the heating element, and a constantly driven cam for periodically interrupting the power circuit to the heating element, that improvement in a regulator for the heating element which comprises a rocking contact carrier operated periodically by movement of said cam, a rigidly mounted contact on said carrier, a cooperating adjustably mounted contact on said carrier for periodically making and breaking the power circuit upon operation of the cam, said adjustably mounted contact being located adjacent a movable portion of said thermal device, a rod extending between said thermal device and said adjustably mounted contact, and control means for selectively varying the effective distance of the rod between the thermal device and the adjustable contact, whereby varying periods of operation of the contacts may be secured, in response to the temperature of the thermal device and the setting of the control means.

LLOYD T. AKELEY.

REFERENCES CITED

The following references are of record in the file of this patent:

UNITED STATES PATENTS

| Number | Name | Date |
| --- | --- | --- |
| 1,962,999 | Owens | June 12, 1934 |
| 2,140,479 | Myers et al. | Dec. 13, 1938 |
| 2,185,759 | Young | Jan. 2, 1940 |
| 2,416,261 | Kenper | Feb. 18, 1947 |
| 2,445,021 | Clark | July 13, 1948 |

OTHER REFERENCES

Note on the Throttling of Electric Heat, Dec. 1937.